(12) United States Patent
Mafi

(10) Patent No.: US 8,746,765 B1
(45) Date of Patent: Jun. 10, 2014

(54) EXTENDIBLE COOKING IMPLEMENTS HAVING ERGONOMIC HANDLING FEATURES

(71) Applicant: Masoud Mafi, Burlington (CA)

(72) Inventor: Masoud Mafi, Burlington (CA)

( * ) Notice: Subject to any disclaimer, the term of this patent is extended or adjusted under 35 U.S.C. 154(b) by 0 days.

(21) Appl. No.: 13/747,734

(22) Filed: Jan. 23, 2013

(51) Int. Cl.
*A47J 43/28* (2006.01)

(52) U.S. Cl.
USPC ............................................................ 294/7

(58) Field of Classification Search
USPC .............. 294/2, 7, 8, 9, 49; 30/342, 142, 162, 30/163; D7/688, 692
See application file for complete search history.

(56) References Cited

U.S. PATENT DOCUMENTS

| | | | |
|---|---|---|---|
| 1,768,425 A | 6/1930 | Smith | |
| 1,960,130 A * | 5/1934 | Trubel | 30/320 |
| 2,873,522 A * | 2/1959 | Homola | 30/129 |
| 3,906,632 A | 9/1975 | Oppenheimer | |
| 3,927,609 A | 12/1975 | Scott | |
| 4,569,130 A | 2/1986 | Koller et al. | |
| 5,206,998 A | 5/1993 | Oriente et al. | |
| D392,851 S * | 3/1998 | Zeller | D7/692 |
| 5,774,994 A * | 7/1998 | Stein et al. | 30/342 |
| 6,049,947 A | 4/2000 | Lu | |
| 6,055,733 A | 5/2000 | Chen | |
| D439,811 S | 4/2001 | Parker et al. | |
| 6,237,226 B1 | 5/2001 | Huang | |
| 6,247,736 B1 | 6/2001 | Esterson et al. | |
| 6,374,500 B2 | 4/2002 | Stein et al. | |
| D459,638 S * | 7/2002 | Wang et al. | D7/692 |
| 6,675,483 B2 * | 1/2004 | Bond et al. | 30/142 |
| 7,805,843 B2 * | 10/2010 | Landsberger et al. | 30/147 |
| 8,006,388 B1 * | 8/2011 | DeJesus | 30/152 |
| 2009/0277015 A1 * | 11/2009 | Duey | 30/160 |

FOREIGN PATENT DOCUMENTS

WO    WO2011082446 A1    7/2011

* cited by examiner

*Primary Examiner* — Paul T Chin
(74) *Attorney, Agent, or Firm* — Ryan Alley Intellectual Property Law

(57) ABSTRACT

Extendable implements include a handle and functional end that extends or retracts therefrom through a release. The handle and functional end are configured to provide user-implement synergy or ergonomics that account for typical hand grips and extension functionality together. Synergistic or ergonomic features can include any combination of positioning the release to avoid a strong grip on an extended implement, configuring the release to require definite voluntary actuation, extension and retraction of the functional end with a single hand not contacting the functional end, a deep handle molded to a forceful open grip, a functional end dimensioned to prevent deflection or breaking during extended typical use, a functional end dimensioned and a release configured to provide reliable extension, retraction, and/or locking of functional end, etc.

20 Claims, 5 Drawing Sheets

EXTENDIBLE COOKING IMPLEMENTS HAVING ERGONOMIC HANDLING FEATURES

BACKGROUND

Tools for working with heat sources, including grills, ovens, ranges, etc., typically have handles separated by long extensions from a functional end. Such extensions permit interaction with food or other material at dangerous or uncomfortable temperatures or smoking conditions by allowing a user to directly manipulate contents of the heat source with an end of the tool at a distance. For example, known tools include functional ends, like spatulas or tongs, separated from a handle by a lengthy shaft. Such tools permit users to handle, flip, grasp, cut, mix, or otherwise manipulate or interact with food or other materials in direct contact with the heat source at a distance with less risk of burn or discomfort or injury to the user from the heat source.

In order to preserve space when not in use, tools can be extendable and collapsible, having a shaft that extends from and retracts to a handle that permits a user to adjust a degree of length of the tool. In this way, an extendable spatula, for example, can be lengthened by extending its shaft from a handle so as to permit manipulation at a distance. The same shaft can be collapsed to the handle to provide a desired shorter handle-to-spatula distance for storage or other manipulation of food where distance from a heat source is not desired.

SUMMARY

Example embodiments include extendable implements that can be grasped by an average human hand about a handle configured to accommodate both the grasp and the extension functionality to enhance interaction of the two. Example embodiments include at least one functional end extendable relative to the handle and a release that controls such extension of the functional end. Example embodiments may include a variety of user-implement ergonomic features.

For example, the thumb may apply pressure on top of the handle, facing the user, and fingers may extend partially around the handle to form an open grip with maximum torqueing force on an extended implement. Or, for example, in order to accommodate the extension functionality and strong grip, the release may be located on the implement to avoid accidental contact with or actuation with the grip. For example, the release could be positioned on a side of the handle away from the thumb, and/or the release could be a spring-biased button-type latch that can be pressed only by voluntary movement of the thumb from the grip. Or, for example, user ergonomics could allow for extension and/or retraction with a single hand and without need for contact with a functional end, such as extension and/or retraction via sliding of a shaft of the functional end in a handle slot. User interaction can also be accommodated by a deeper handle that has sufficient width to accommodate the thumb but extends away from the user in a depth direction to a greater degree, a bottom surface that includes a grip surface to accommodate the fingers extending therearound, release placement above or below such a grip surface, variable or multiple release placement or usability based on handedness, a deeper extension shaft on the functional end to prevent deflection or breaking during use when lowering or advancing the implement in connection with a heating source, etc.

Example embodiments can have great variety. For example, functional ends can be any desired implement compatible with example embodiment handles. Degrees and types of extension of the functional ends can be varied, and handle shapes, sizes, fabrication, and material can be selected as needed.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
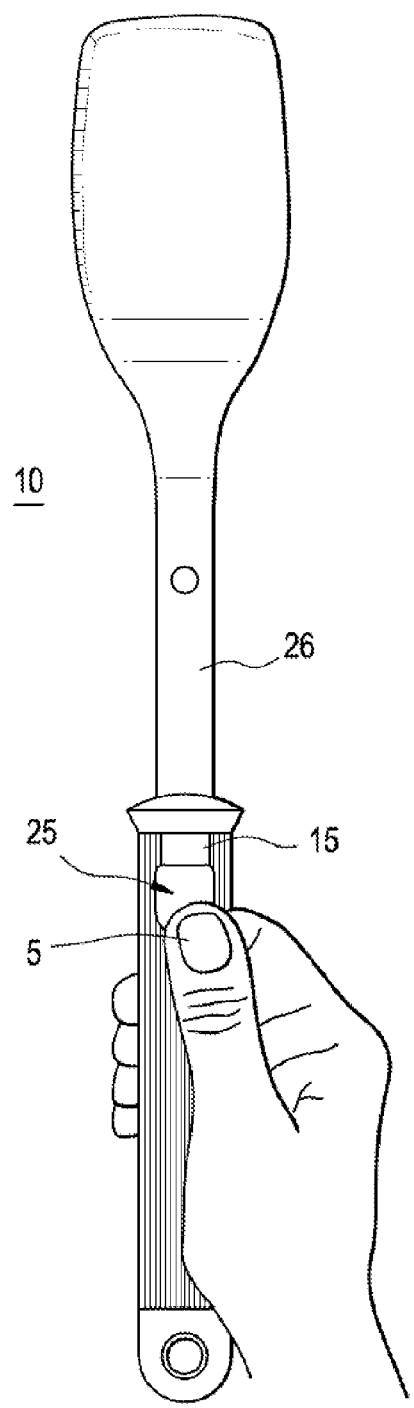
FIG. 1 is an illustration of a related extendable cooking implement.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments. Several different embodiments not specifically disclosed herein fall within the scope of the appended claims; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to in a spatial or physical relationship, as being "connected," "coupled," "mated," "attached," or "fixed," to another element, it can be directly connected or coupled to the other element or intervening elements may be present. In contrast, when an element is referred to as being "directly connected" or "directly coupled" to another element, for example, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that terms like "have," "having," "comprises," "comprising," "includes," and/or "including," when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

Applicants have recognized that implements having functional ends at substantial distances from a handle and human user of the same may require significant handling force and/or dexterity to properly wield the functional ends. For example, using a spatula end extended to over a foot's length from a user's hand on a handle may require a strong grip on the handle and significant torqueing force to flip or otherwise handle a heated subject, such as a steak, weighing several ounces. Or, for example, a basting brush end extended far from a user's hand on a handle may require a strong grip with very delicate and certain hand motions to properly baste or otherwise interact with a heated subject on a grill or cooking surface. Thus, while the significant distances between functional end and handle may permit users and their hands to remain a safe and comfortable distance from any heating source while manipulating food or other materials in direct contact with the heating source, Applicants have recognized that such distances also often require a user to forcefully and immovably grip a handle connecting to a functional end.

Figure 2:
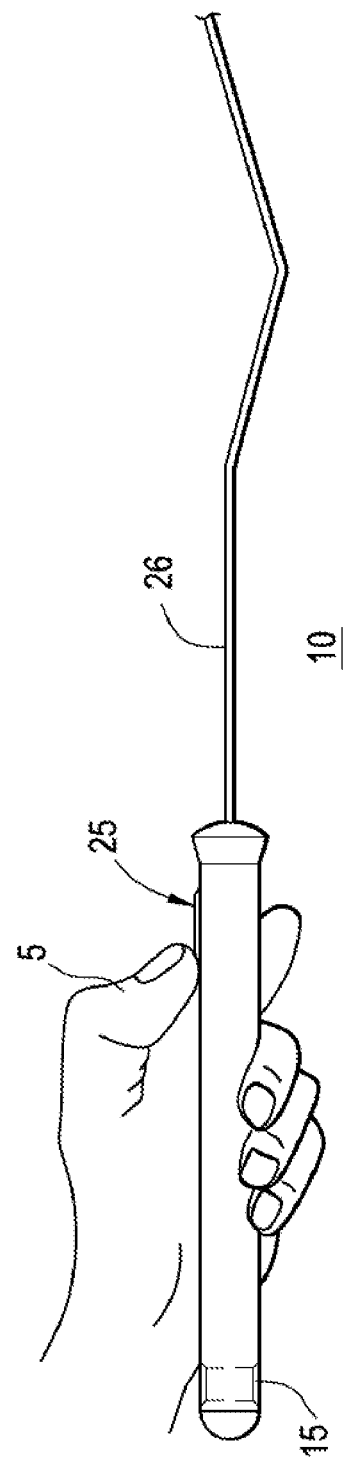
FIG. 2 is an illustration of a related extendable cooking implement in use.

Applicants have further recognized that the shape and functional characteristics of the human hand and gripping functionality of the same tend to hold or otherwise accommodate tools with functional end and handle "facing" the user, with the thumb on top and remaining fingers under a handle. For example, as shown in FIGS. 1 and 2, a user typically grips a spatula, knife, or other implement 10 with thumb 5 on top surface 15 of the implement, where top 15 is in a plane generally perpendicular to a line between the user and functional end as well as usually perpendicular to a direction in which the implement is moved during use. In extendible cooking tools 10 having a release latch 25 on top surface 15, this will typically place the thumb near or on release latch 25. In the instance of a strong grip, such as when extendable implement 10 is fully extended and in use, the higher force from thumb 5 required to manipulate implement 10 can actuate release latch 25, causing extendable implement 10 to undesirably collapse or extend exactly when it is being most forcefully used and being taken advantage of its extendible properties. Moreover, in the instance of a strong grip where a forceful thumb 5 will be on a top 15 of tool 10, it may be exceedingly difficult for a user to readily adjust a grip to fully clear release latch 25, resulting in higher risk of unintentional actuation of release latch 25 due to forceful thumb 5 contacting release latch 25 during use of implement 10. Latch 25 is typically placed on top surface 15 in existing extendible implements 10 for manufacturing simplicity, immediate recognition of latch 25 that will face a user in this orientation, and so as to interact effectively with extendable shaft 26, which extends a greatest area in the plane of top surface 15. Because shaft 26 is generally thinnest in a direction perpendicular to top surface 15, latch 25 need only minimal depression in order to fully clear a hole all the way through shaft 26 in this direction.

Applicants have further recognized that existing extendable implements 10 require some amount of manual force in a direction along a length of shaft 26 in order to extend or retract a functional end from or into a handle of implement 10, even with latch 25 actuated. This force can be undesirably provided by food or cooking surface during use of implement 10 when thumb 5 accidentally depresses latch 25. In other instances, a user must manually apply an extending or retracting force to shaft 26 during or shortly after use of cooking implement 10 with a heat source. This force may be applied by a user's free hand, resulting in burning, soiling, and/or general inconvenience.

Applicants have developed unique solutions to the above-described and other problems recognized by Applicants. The present invention/claimed subject matter, which encompass and extend beyond any example embodiment described below and illustrated in the figures, enable solutions to these and other problems. As such, the present invention is an extendable implement having one or more ergonomic features for improved utility and human user interaction. These ergonomic features can include deep handles to better accommodate typical human grips, deep shaft extensions to reinforce implements in their common direction of use, release positioning that is both fully apart from grip positions to prevent accidental actuation and still permitting single-handed actuation, single-handed actuation and extension and/or retraction that reduces a need for user contact with a functional end, and/or other human-implement synergies described below or not. While embodiments of the present invention include one or more ergonomic features in any combination, it is understood that additional features and variations are useable therewith, and that the following example embodiments illustrate merely a non-limiting example combination of features.

Figure 3:
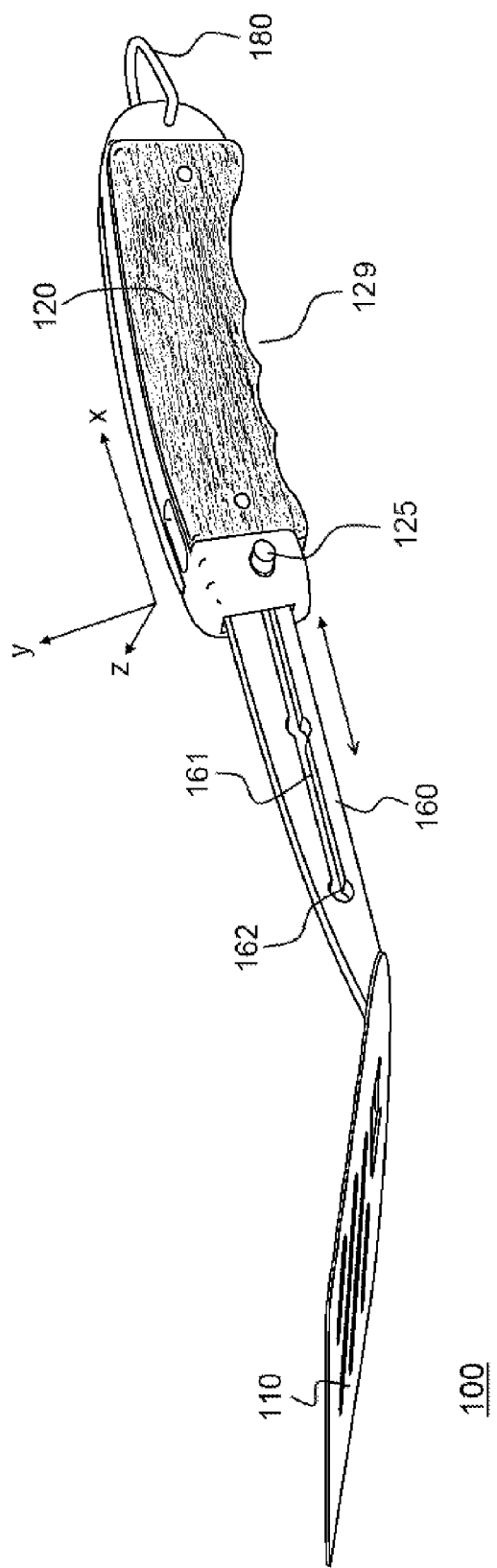
FIG. 3 is an illustration of an example embodiment extendable implement.
Figure 4:
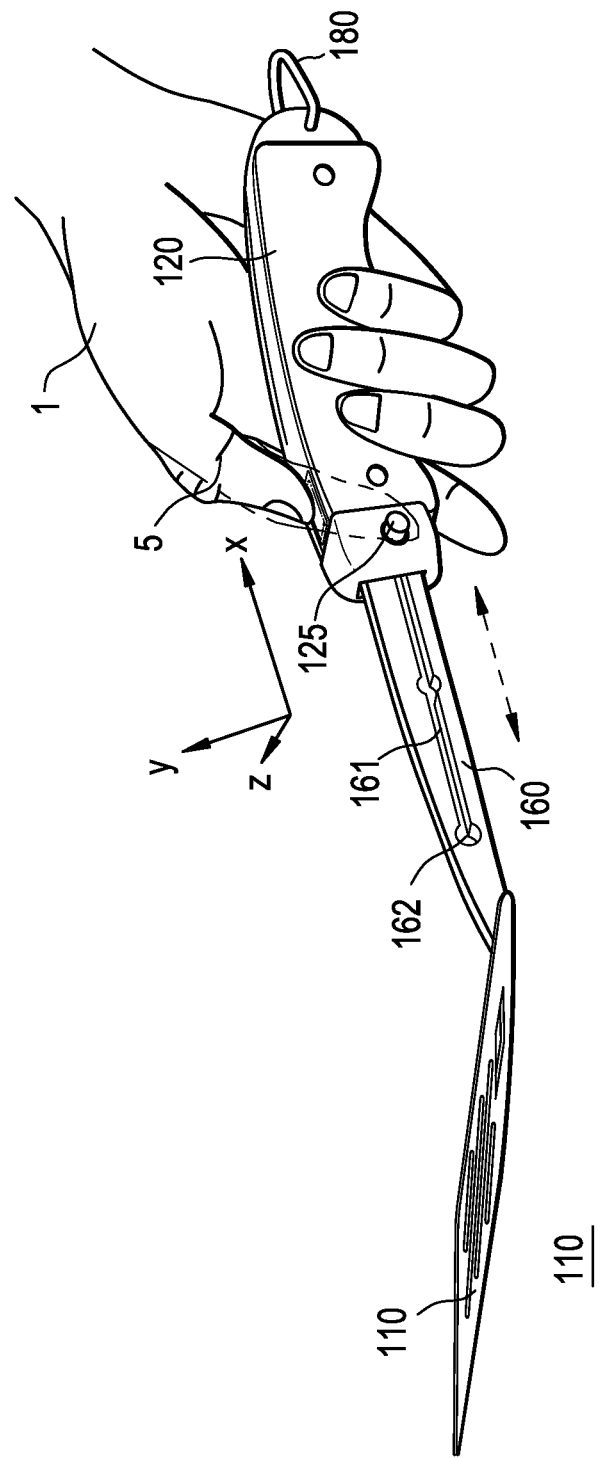
FIG. 4 is an illustration of an example embodiment extendable implement in use.

FIGS. 3 and 4 are illustrations of an example embodiment extendable implement 100. As shown in FIG. 3, example embodiment extendable implement 100 includes a handle 120 and a functional end 110 than can be extended relative to handle 120. Functional end 110 is shown as a spatula in FIGS. 3 and 4, but functional end 110 may be embodied in several different or combined ways, including a blade, brush, whisk, lighter, mixer, spoon, scissors, tongs, thermometer, grill scraper, wire cleaner brush, etc., depending on a desired function.

Functional end 110 is extendible from handle 120 in a length direction, shown along axis "x" in FIG. 3. For example, functional end 110 may be extended and collapsed at least a length of handle 120, which may be six inches or longer. Functional end 110 can be locked at one or more positions of extension based on user needs for reach or compactness. Handle 120 may take on a variety of ergonomic shapes, sizes, lengths, materials, etc. and may be useable with additional features. For example, handle 120 may include a lower grip surface 129 that allows individual fingers to better fit and be positioned at desired concave points on handle 120, or a hanging loop 180 may be located at one end length of handle 129 for hanging example embodiment extendable implement 100 from a grill hook, as could a bottle-opener or blade, depending on desired function.

Extension and/or retraction of functional end 110 may be accomplished in several ways. As shown in FIG. 3, example embodiment extendable implement can include a shaft 160 that collapses or fits into handle 120 in a length direction along the "x" axis, while remaining stationary in a depth and width dimension, shown by "y" and "z" axes in FIG. 3. Shaft 160 may include a track 161 that extends a desired length in shaft 160 and mates with a latch 125 in handle 120. Track 161 can include a variety of set positions 162 that lock with latch 125 to prevent any further extension or retraction from the set positions without actuation of latch 125. Of course, other extension and/or releases, aside from shaft 160 passing into handle 120 via mating of track 161 with latch 125, are useable in example embodiments, including ratchets and stops, frictional stops, spring-based extension and compression, electronic or motorized extenders, etc. Similarly, although latch 125 is shown as a single button with an internal bushing interacting with track 161 and/or set positions 162, it is understood that other releases, including switches, screws, electronic actuators, magnets, etc. can be used to releasably secure functional end 110 at desired extension points and/or wholly prevent or allow any extension and/or retraction.

As shown in FIG. 4, example embodiment extendable implement 100 is designed to accommodate a natural human user grip on handle 120. A typical user hand 1 can fit about handle 120 naturally owing to handle 120's larger depth in the "y" direction and relatively narrower width in the "z" direction, permitting hand 1 to naturally grip with fingers about a matching lower surface 129, without fully extending around handle 120 to form a closed grip or reach latch 125. Further, thumb 5 can naturally rest on and/or bias a top surface of handle 120 in the z-x plane. In this configuration, a user can naturally grip handle 120 with functional end 110 facing the user in the z-x plane, typically perpendicular to a line of sight with the user to permit hand-eye coordination.

If handle 120 extends a greater distance in a depth "y" direction, shaft 160 may correspondingly be relatively deeper in the "y" direction and still be accommodated within handle 120, if used in this manner for extension and compression, such as in example embodiment extendable implement 100. When functional end 100 is significantly elongated, common lifting/pressing force in the "y" direction on functional end 110 and/or torque in the "z" direction (rotation in the y-x plane) may place large amounts of material normal and shear stress on shaft 160. A deeper shaft 160 in the "y" direction may reduce the risk of strain or deformation by increasing the relevant moment of inertia and reinforcing shaft 160 against forces in the "y" direction on handle 120. Because actions in the "y" and "x" directions may be relatively common for a user gripping handle 120 as shown in FIG. 4, such as through lifting, flipping, cutting, compressing, scraping, basting, probing, etc., decreased deformation of shaft 160 in the "y" depth may permit fine actions at handle 120 to be more faithfully reproduced in functional end 110 without bending or deformation. Moreover, a thinner width in the "z" direction may permit less material and weight to be used in construction of example embodiment extendable implement 100 and may permit latch 125 and any locking mechanism associated therewith to pass through or otherwise lock with track 161 and/or set positions 162 with more accuracy and a smaller degree of movement in the width direction "z".

Latch 125 is positioned away from hand 1 and thumb 5 in a natural grip to user example embodiment implement 100, such as near an end and on a side of handle 120 in the y-x plane as shown in FIGS. 3 and 4. In this way, during a forceful grip on handle 120, such as during movement, manipulation, or other interaction with food and/or a heating surface with functional end 110, thumb 5 and hand 1 are free to apply large amounts of pressure in any direction on handle 120 without contacting and/or actuating latch 125. Rather, a user can make only a voluntary movement (shown in phantom limes in FIG. 4) of thumb 5 from a top of handle 120 to a side with latch 125 in order to permit functional end to be extended and/or contracted in the length direction only at desired times, shown in phantom in FIG. 4. The side for latch 125 may be chosen based on right- or left-handedness, with the example of FIGS. 3-5 showing a right-handed embodiment.

If latch 125 is actuated in the width direction "z," such as by the button example of FIGS. 3 and 4, this may further avoid accidental slipping and/or actuation of latch 125 with thumb 5 that naturally rests on a top surface in the z-x plane of handle 120. As such, in the example positioning of FIGS. 3 and 4, a user may be able to maintain his or her hand 1 gripped about handle 120 and actuate latch 125 solely through voluntary movement of thumb 5. An extendable functional end 110 and shaft 160 may remain static with handle 120 at a desired degree of extension during a normal grip and use of example embodiment extendable implement 100.

Of course, latch 125 may be positioned in several other positions away from hand 1 and thumb 5 during use and grip of handle 120. For example, latch 125 may be on an opposite side of handle 120 in the y-x plane, entirely below a user's hand 1 on handle 120, at a lengthwise end of handle 120 opposite functional end 110, and/or as multiple opposite latches 125 may accommodate right- and left-handed users, for example.

Figure 5:
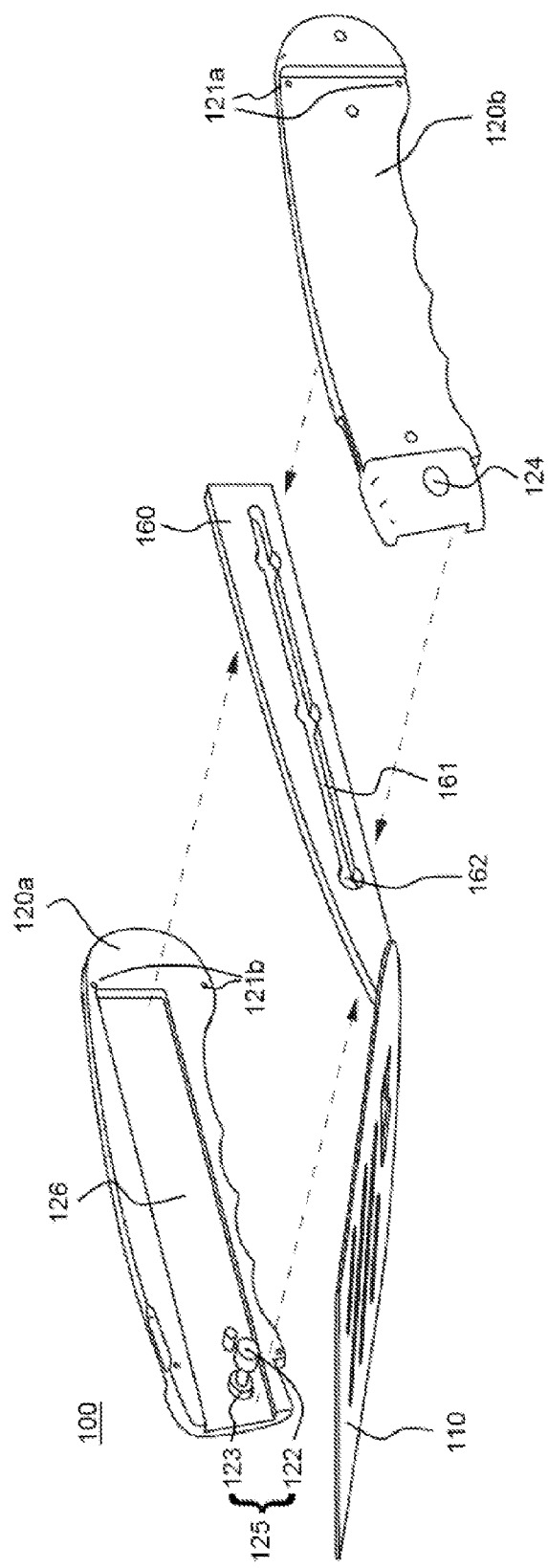
FIG. 5 is a blown-up illustration showing assembly/disassembly of an example embodiment extendable implement.

FIG. 5 is a blown-up illustration of example embodiment extendable implement 100 showing various internal components of the same. As seen in FIG. 5, handle 120 (FIGS. 3, 4) may be assembled from multiple removable pieces, such as opposite casings 120a and 120b. Casings 120a and 120b may mate and be removably affixed by matching receptors 121a and 121b in the casings at matching locations between the casings 120a and 120b for appropriate assembly. Receptors 121a and 121b may use screws, latches, magnets, etc. in order to removably mate opposite casings 120a and 120b. By disassembling casings 120a and 120b by disengaging receptors 121a and 121b, users may remove and/or swap in different functional ends 110 based on desired functionality. Of course, it is equally possible in other example embodiments that handle be a unitary piece that cannot be disassembled without destruction, and functional end 110 can be removed and swapped through actuation of latch 125 and/or through use of another functional end release.

As shown in FIG. 5, casings 120a and 120b may define a slot 126 into which shaft 160 can fit and extend in a lengthwise direction to provide extension and retraction of functional end 110. Casings 120a and 120b may also include a release for extendibility or retraction, such as latch 125 that interacts with shaft 160 to hold shaft 160 and functional end 110 at desired positions. For example, latch 125 may include a spring-biased compressible button 122 and bushing 123 that mates with track 161 and set positions 162 to provide desired extension, retraction, and locking. A larger portion of bushing 123 may fit in set positions 162, but not track 161, so as to lock with set positions 162 and hold shaft 160 at a particular degree of extension when uncompressed. When button 122 is depressed intentionally, a smaller portion of bushing 123 may fit in both set positions 162 and track 161, allowing for shaft to move a full range of track 161 length to desired set positions and/or degrees of extension. Button 122 may extend through a hole 124 in casing 120b to provide access to a user when casings 120a and 120b are assembled. While latch 125 provides the positioning, extendibility, and locking features of example embodiment implement 100 compatible with the ergonomic dimensions of the same and at a position likely to avoid unintentional extension or retraction of functional end 110, it is understood that other releases, such as ratchets, switches, transducers, etc. may be used in other example embodiments to achieve selective extension of an implement that accommodates a user's grip.

Shaft 160 may be captured within slot 126 and by latch 125 so as to provide a limited amount of extension in length. Latch 125 and shaft 160 may be sized to provide free movement of shaft 160 within a whole range of extension; that is, slot 126 may be somewhat larger than shaft 160 and bushing 123 somewhat smaller than track 161 and set positions 162 when actuated such that shaft 160 will move lengthwise in slot 126 under minimal force. Such force may be provided by gravity alone, and a user may extend or retract functional end 110 by actuating latch 125 and facing functional end 110 downward or upward. Swinging example embodiment implement 100 with latch 125 actuated may provide a similarly sufficient amount of force for extension. This may provide extension and retraction functionality in example embodiment extendable implement 100 without the need for user direct contact with functional end 110, which may be hot or soiled. Because slot 126 and/or latch 125 may otherwise capture shaft 160, functional end may be freely moveable only in an extension/retraction direction and only to a limited degree, avoiding unwanted disassembly or complex movement of functional end 110.

An example embodiment thus being described, it will be appreciated by one skilled in the art that example embodiments may be varied and substituted through routine experimentation while still falling within the scope of the following claims. For example, although an example embodiment is described with a spatula extending from a prismatic handle with some well-defined flat surfaces, it is understood that example embodiment implements may include a wide variety of kitchen, grill, cooking, and maintenance tools and devices having handles with much more curvature and poorly-defined surfaces. Further, it is understood that example embodiments can be used in connection with any type of application where an extendable functional end is useful to provide desired distance between a user and a subject. Such variations are not to be regarded as departure from the scope of the following claims.

What is claimed is:

1. An implement comprising:
a handle shaped to accommodate a human hand grip with a thumb on top of the handle and fingers extending partially around the handle;
a functional end connected to the handle and extendable and retractable relative to the handle, wherein the functional end is positioned in a plane of the top of the handle so as to face a user during operation; and
a release positioned on the handle at a position toward the functional end beyond the fingers and facing away from the top to completely avoid the thumb and the fingers of the grip, wherein the release and the functional end are correspondingly configured to permit extension and retraction of the functional end when the release is actuated.

2. The implement of claim 1, wherein,
the functional end is extendable in a length direction,
the handle extends in a depth direction greater than in a width direction,
the depth direction is perpendicular to the length direction,
the depth direction is directed from the top to a bottom of the handle, and
the width direction is perpendicular to both the depth and the length directions and is directed from one side to another side of the handle.

3. The implement of claim 2, wherein the release is positioned on one of the sides of the handle.

4. The implement of claim 3, wherein the handle includes a bottom surface shaped with several concavities to match contours of the fingers, and wherein the release is positioned on the one of the sides at a lengthwise position beyond the several concavities so as to completely avoid the grip.

5. The implement of claim 3, wherein the release is positioned on a left side of the handle and the handle is shaped to accommodate a grip of a right hand.

6. The implement of claim 1, wherein the release is positioned to be reachable and actuated by only the thumb departing from the grip.

7. The implement of claim 1, wherein the release is a single latch extending from only one of the sides of the handle, and wherein the release actuates by compression toward a side of the handle perpendicular to the top where the thumb grips.

8. The implement of claim 1, wherein the functional end includes a shaft that is captured by the handle and the release.

9. The implement of claim 8, wherein the release is a latch having a button and a variable-diameter bushing, wherein the shaft includes an internal track that selectively engages with the bushing, and wherein the internal track and bushing prevent the shaft from extending beyond the button.

10. The implement of claim 9, wherein the track extends completely through the shaft in a width direction and has a variable depth such that the shaft is moveable relative to the latch only when the latch is actuated, and wherein the latch is biased to remain unactuated when not contacted by the thumb.

11. The implement of claim 1, wherein the functional end includes a spatula facing a same direction as the top of the handle.

12. The implement of claim 1, wherein the handle is formed by a plurality of removably joined casings.

13. The implement of claim 12, wherein the casings, when joined, form the handle and define a slot into which a shaft of the functional end can pass to provide extension and retraction of the functional end.

14. The implement of claim 13, wherein the slot and the release are configured to allow the functional end to extend or retract under gravity alone.

15. An implement comprising:
a handle having a top that faces a user, a bottom opposite the top, and a first side and an opposite second side both between and perpendicular to the bottom and the top, wherein,
the top and the bottom are positioned apart a first distance in a depth direction,
the first and the second sides are positioned apart a second distance in a width direction, and
the first distance is larger than the second distance sufficient for an average human hand gripping the handle to surround the bottom and the first side and to position a thumb of the gripping hand on the top of the handle;
a functional end extendable and retractable relative to the handle; and
a release on the opposite second side of the handle, wherein the release and the functional end are correspondingly configured to permit extension of the functional end when actuated.

16. The implement of claim 15, wherein the functional end cannot extend completely outside the handle.

17. The implement of claim 16, wherein the functional end includes a shaft that is captured by the handle and moveable in only a length direction within the handle when the release is actuated.

18. An implement comprising:
a handle;
a functional end including a shaft that passes into the handle; and
a release, wherein the functional end is not extendable and not retractable in the handle when the release is not actuated, wherein the functional end is extendable and retractable in the handle and not to outside the handle when the release is actuated, and wherein the functional end is extendable or retractable under gravity alone when the release is actuated and the functional end is pointed with gravity in a direction of extension or retraction.

19. The implement of claim 18, wherein the release is positioned on the handle at a location completely separate from any area that would be contacted by a human hand gripping the handle while using the functional end, and wherein the release can be actuated only by the hand departing from the grip.

20. An implement comprising:
a handle shaped to accommodate a human hand grip with a thumb on top of the handle and fingers extending partially around the handle;
a functional end connected to the handle and extendable and retractable relative to the handle in a length direction, wherein,
  the functional end includes a shaft that is captured by the handle,
  the shaft extends in a depth direction greater than in a width direction,
  the depth direction is perpendicular to the length direction and is directed from the top to a bottom of the handle, and
  the width direction is perpendicular to both the depth and the length directions and is directed from one side to another side of the handle; and
a release positioned on the handle at a position toward the functional end beyond the fingers and facing away from the top to completely avoid the thumb and the fingers of the grip, wherein the release further captures the shaft to permit extension and retraction of the functional end when the release is actuated.

* * * * *